Patented Feb. 5, 1935

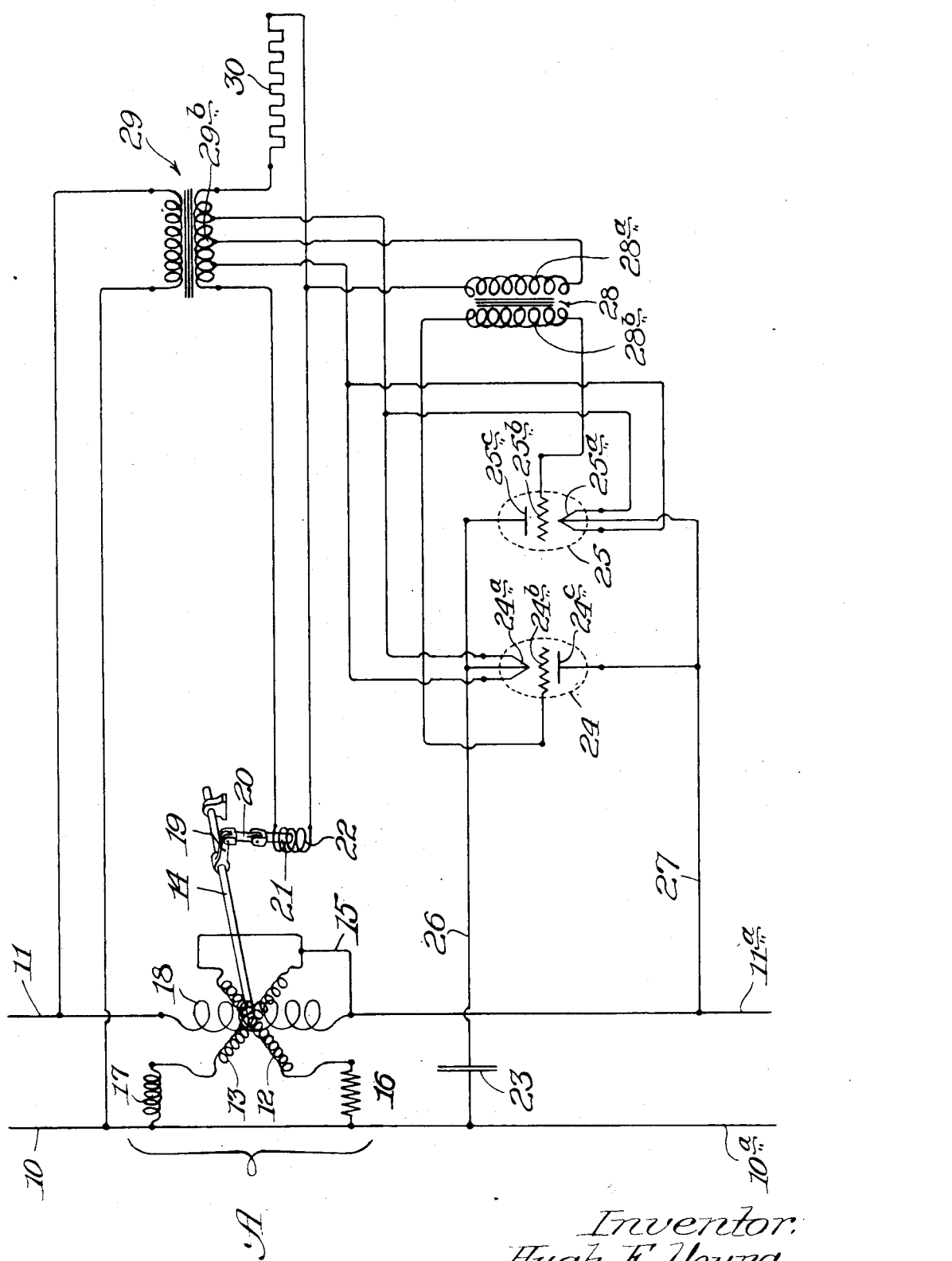

1,990,261

UNITED STATES PATENT OFFICE 1,990,261

POWER FACTOR CONTROLLER

Hugh E. Young, Chicago, Ill.

Application August 24, 1933, Serial No. 686,642

8 Claims. (Cl. 172—246)

This invention relates to improvements in power factor controlling apparatus and, more especially, such a device for automatically controlling or maintaining the proper power factor in an A. C. power line.

Among the features of my invention is the provision of such apparatus that is designed to counteract load disturbances of the power factor in order to maintain the latter substantially constant.

Other features and advantages of my invention will appear more fully as I proceed with my specification.

In that form of apparatus shown diagrammatically in the accompanying drawing—

10, 11 may indicate the A. C. power line, the wires 10ª, 11ª leading to the load.

A indicates, in general, a power factor meter of well-known construction. It will suffice to say that this instrument includes the two coils 12 and 13 arranged at an angle of 90° with respect to each other and carried by the rotatable shaft 14. Two ends of the coils 12 and 13 are connected by the wire 15 to the power wire 11. 16 indicates a non-inductive resistance between coils 12 and the other side of the line. 17 indicates a high inductance between the coil 13 and the other side of the line. Because of this construction, the current in the two coils 12 and 13 will differ by substantially 90° in time phase.

18 is a fixed coil in the wire 11 carrying the circuit current. The spindle or shaft 14 carrying the coils 12 and 13 is so located that rotation of the shaft will permit either one coil 12 or the other coil 13 to assume a position substantially parallel with the coil 18, depending upon the power factor, in accordance with the well-known operation of a power factor meter. For example, at unity power factor the coil 12 will lie substantially parallel with the coil 18 and at zero power factor the coil 13 will lie substantially parallel with coil 18. For power factors between unity and zero the coils will take corresponding intermediate positions. It will be seen, therefore, that the shaft 14 will be rotated by the coils of the power factor meter, depending upon the power factor in the line.

The rotatable shaft 14 carries a crank arm 19 connected by a link 20 to a movable core 21 in the inductance 22. The parts are so arranged that changes in the power factor will move the core 21 to vary the inductance 22.

23 indicates a condenser connected across the power lines 10 and 11 through the full wave grid-controlled arc rectifying tubes 24 and 25. In accordance with well-known principles, a condenser across the circuit affects the power factor, that is, it produces a leading power factor. Also, the amount of lead depends on the vector sum of the resistance in series and the capacity. The greater the resistance, the less the lead.

In my apparatus the capacity of condenser 23 is fixed, but the tubes 24 and 25 are controlled so as to create more or less resistance in series with the condenser to maintain the power factor constant. This is accomplished by controlling the tubes by timing their grid voltages in accordance with the tendencies of the power factor to change. In this way the power factor is maintained substantially constant.

The condenser 23 has one side connected to the line 10 and the other side connected by the wire 26 to the cathode 24ª of one tube and the plate 25ᶜ of the other. The corresponding plate 24ᶜ and cathode 25ª are connected by the wire 27 to the other power wire 11.

The grids of the two tubes are indicated by 24ᵇ and 25ᵇ. These grids are supplied by the secondary coil 28ᵇ of a grid transformer 28, the primary 28ª of which is supplied by the secondary coil 29ᵇ of the transformer 29 which is activated from the power lines 10 and 11. The circuit from the secondary 29ᵇ supplying the primary 28ª of the grid transformer 28 includes both the variable inductance 22 and the fixed resistance 30. It will be seen, therefore, that the incorporation of this inductance and resistance in the grid circuits supplying the voltages to the grids 24ᵇ and 25ᵇ will cause more or less phase splitting, depending upon the relationship between the inductance and resistance. It will be seen, also, that movements of the plunger 21 in the inductance 22 will vary said inductance to change this relationship to vary such phase splitting. The apparatus is so arranged that any tendency of the power factor to lag will change the inductance in coil 22 to modify the voltage on the grids 24ᵇ and 25ᵇ to let more current flow through the condenser 23 to prevent such lagging of the power factor and vice versa. In this way the power factor can be maintained substantially constant.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. Power factor controlling apparatus, including; a condenser connected across the supply line; a grid-controlled arc rectifying tube modifying the power factor control action of the condenser; and means whereby changes in the power factor of the supply line modify the voltage on the grid-controlled arc rectifying tube to modify the condenser action to maintain the power factor of the supply line substantially constant.

2. Power factor controlling apparatus, including; a condenser connected across the supply line; a grid-controlled arc rectifying tube modifying the power factor control action of the condenser; means for splitting the phase of the voltage on the grid of the tube; and means whereby changes in the power factor of the supply line change the phase splitting to modify the condenser action to maintain the power factor of the supply line substantially constant.

3. Power factor controlling apparatus, including; a condenser connected across the supply line and through a grid-controlled arc rectifying tube; means for imposing a control voltage on the grid of the tube to modify the power factor control action of the condenser; and means controlled by changes in the power factor of the supply line to modify the grid control voltage of the tube to modify the condenser action to maintain the power factor of the supply line substantially constant.

4. Power factor controlling apparatus, including; a condenser connected across the supply line and through a grid-controlled arc rectifying tube; means for imposing a split phase control voltage on the grid of the tube to modify the power factor control action of the condenser; and means controlled by changes in the power factor of the supply line for changing the phase splitting of the grid control voltage to modify the condenser action to maintain the power factor of the supply line substantially constant.

5. Power factor controlling apparatus, including; a condenser connected across the supply line; a grid-controlled tube modifying the power factor control action of the condenser; and means whereby changes in the power factor of the supply line to modify the voltage on the grid-controlled tube to modify the condenser action to maintain the power factor of the supply line substantially constant.

6. Power factor controlling apparatus, including; an electrical device wherein the current leads an applied alternating voltage; a grid-controlled arc rectifying tube controlling the amount of line current passing through said electrical device; and means whereby variations in the power factor of the line current modify the voltages applied to the grids of said tubes to control the amount of line current passing through said device to maintain the power factor of the supply line substantially constant.

7. Power factor controlling apparatus, including; an electrical device for passing alternating current, wherein the current leads the voltage applied thereto; a grid-controlled arc rectifying tube controlling the amount of line current passing through said electrical device; means for splitting the phase of the voltage applied to the grid of said tube with reference to the voltage applied to the anode thereof; a power factor meter; and means whereby the power factor meter controls the phase splitting, thereby controlling the amount of line current passing through said electrical device and thus maintaining the power factor of the line substantially constant.

8. Power factor controlling apparatus, including; an electrical device for passing alternating current, wherein the current leads the voltage applied thereto; a device for translating variations in the power factor in a line into mechanical motion; and means whereby said last-named device variably and continuously controls, throughout a predetermined range, the amount of line current passing through said first-named electrical device and thus maintains the power factor in the line substantially constant, said means including an arc rectifying tube.

HUGH E. YOUNG.